United States Patent Office 3,634,406
Patented Jan. 11, 1972

3,634,406
OXIDATION OF LACTAMS TO CYCLIC IMIDES
Arthur R. Doumaux, Jr., Charleston, W. Va., assignor to Union Carbide Corporation, New York, N.Y.
No Drawing. Filed Sept. 17, 1969, Ser. No. 858,843
Int. Cl. C07d 41/06, 29/42, 27/08
U.S. Cl. 260—239.3        10 Claims

ABSTRACT OF THE DISCLOSURE

Cyclic imides are produced by contacting lactams with a peracid in the presence of a metal ion catalyst from the first row of transition metals, e.g., manganese and cobalt.

---

This invention relates to the liquid phase production of cyclic imides.

In one aspect, the invention relates to the rapid oxidation of lactams to produce cyclic imides.

In another aspect, the invention relates to a relatively low temperature oxidation of lactams to produce cyclic imides.

Earlier attempts to produce cyclic imides relied heavily upon ring closure methods, employing a half-acid, half-amide intermediate. This approach works well with 5 or 6 membered ring compounds, but when efforts were made to produce higher series members of 7 or more, the resulting product appeared in a low yield.

Adipamide has been pyrolyzed at 250° C. to give adipimide in a 1.2 percent yield and ammonia as shown in the report of H. K. Hall, Jr. and A. K. Schneider in J. A. Chem. Soc., 80, 6409 (1958). Heating δ-cyanovaleric acid at 230° C. gave trace yields of adipimide since the reaction was highly reversible. This, in turn, led to the use of the imoniumphydrin of cyanovaleryl chloride by the same worker to give adipimide in a 12 percent yield after pyrolysis at 180° C. and a subsequent water treatment. These investigations are reported in Zhur. Obshchei Khim., 25, 2127 and Zhur. Obshchei Khim., 30, 596 (1960). The Beckmann rearrangement of 1,2-cyclohexanedione dioxime rendered adipimide in a 14 percent yield, but this process also requires two steps, and is discussed in Bull. Chem. Soc. Japan, 34, 1812 (1961).

Cyclic imides were produced from the corresponding lactam by persulfate oxidation, but this reaction gave generally low yields, and when adipimide production was attempted from E-caprolactam, only polymer resulted; see H. L. Needles and R. E. Whitfield, J. Org. Chem., 31, 341 (1966).

Various oxidation reactions are present in the literature wherein hydroperoxides, either alone or in combination with various metal catalysts, are used to produce a host of materials. Tert.-butyl hydroperoxide, acting by itself, is known to convert cyclic ketones to lactones and is described more fully by D. C. Dittmer et al. in Chem. Ind. (London), 152, (1964). Cycloaliphatic amines have been turned into the corresponding oximes by using tert.-butyl hydroperoxide and a vanadium metal catalyst; see Belgian Patent 668,811. An iron metal catalyst and tert.-butyl hydroperoxide system has been used to convert acrolein to methacrylic acid as set forth in Netherlands patent application 64–12,904.

Imides and especially cyclic imides have a variety of uses. Adipimide has been shown to be an effective activator in the polymerization of 2-pyrrolidone and is claimed as such in U.S. Patent 3,033,831. Succinimide is a valuable intermediate in the production of N-vinyl succinimide, which has been polymerized to make plastic films and dye receptors. The presence of the imide grouping on these compounds renders them particularly useful as dye receptors.

It has now been found that cyclic imides can be formed when a lactam having at least one unsubstituted methylene group adjacent to the ring nitrogen is contacted in the liquid phase with a solution of peracid in the presence of a metal ion catalyst of manganese, cobalt, nickel, vanadium, or iron. This process is noted for its uniform application, high selectivity and mild reaction conditions. The reaction also differs from many earlier processes in that the desired product results from a one-step process, which would suppress the formation of undesirable intermediates.

The general reaction is as follows:

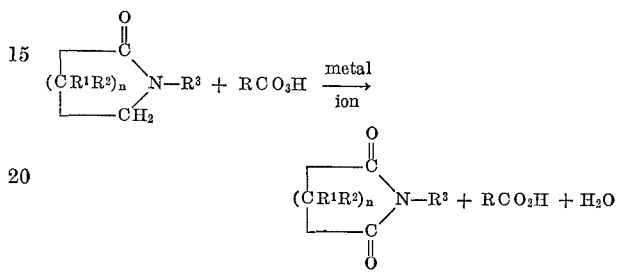

where $R^1$ and $R^2$ can be alike or different and are selected from the group consisting of hydrogen, alkyl, aryl, and alkaryl; $R^3$ is selected from the group consisting of hydrogen and alkyl, R is a hydrocarbyl group such alkyl, aryl, aralkyl, alkaryl, and the like; and $n$ is an integer from 3 to 13.

Various lactams which can be used in the process of the instant invention and their corresponding cyclic imides are listed below:

| Lactam | Corresponding cyclic imide |
|---|---|
| 2-pyrrolidone | Succinimide. |
| N-methyl-2-pyrrolidone | N-methyl succinimide. |
| 2-piperidone | Glutarimide. |
| E-caprolactam | Adipimide. |
| N-phenyl-2-pyrrolidone | N-phenyl glutarimide. |
| N-p-tolyl-E-caprolactam | N-p-tolyl adipimide. |
| N-benzyl-3-phenyl-2-piperidone | N-Benzyl-3-phenyl glutarimide. |
| Lactam of 7-amino-heptanoic acid | Heptanimide. |
| Lactam of 8-amino-octanoic acid | Octanimide. |
| Lactam of 9-amino-nonanoic acid | Nononimide. |
| Lactam of 10-amino-decanoic acid | Decanimide. |
| Lactam of 15-amino-pentadecanoic acid | Pentadecanimide. |
| 13-methyl-13-pyrrolidone | 3-methyl succinimide. |
| 4-phenyl-E-caprolactam | 5-phenyl adipimide. |
| Phthalimidine | Phthalimide. |
| 2,2-dimethyl-5-valerolactam | 3,3-dimethyl glutarimide. |

Lactams containing functional moieties such as alcoholic, ketonic, epoxy and olefinic groups can be used but a major disadvantage with such compounds is that they can lead to further oxidation of the lactam and result in undesired side-reactions.

The peracids contemplated for use in the process of the instant invention are those peracids of the formula $RCO_3H$ wherein R is a hydrocarbyl group such as methyl, ethyl, propyl, t-butyl, benzyl, methylbenzyl, and the like. Typical peracids are peracetic acid, perpropionic acid, perhexanoic acid, perdodecanoic acid, perbenzoic acid, permethylbenzoic acid, mono-perphthalic acid, and per-t-butyric acid. Peracetic acid is preferred.

The metal ion catalysts are selected from the first row of the transition metals and include manganese, cobalt, nickel, iron, and vanadium. The metal ion catalysts can be present in different oxidation states; e.g. manganese (II) and manganese (III) are both suitable. The metal ion catalysts can contain various counterious and ligands such as the halides, especially chloride; acetate, acetylacetonate, and the like. Typical metal ion catalysts include vanadous acetylacetonate, manganous acetylacetonate, manganic acetylacetonate, manganese acetate, manganese chloride, ferrous chloride, ferric chloride, ferric acetylacetonate, cobaltic acetylacetonate, cobalt chloride, cobaltous acetylacetonate, nickel acetylacetonate. Manganese chloride is preferred.

The metal ion catalyst is added in amounts sufficient to activate the reaction. The preferred catalyst range is from $10^{-6}$ to $10^{-3}$ molar.

To successfully conduct the reaction, one must take the tendency of peracids to thermally decompose into consideration. Operation at high reaction temperatures tends to produce a higher peracid decomposition rate than a lactam oxidation rate, which jeopardizes reaction economics. The reaction is conducted at temperatures of from about −50° C. or lower, to about 150° C. or higher. The preferred temperature range is from about −20° C. to about 30° C., while the most preferred range is from about −10° C. to about 25° C.

When higher reaction temperatures are used, it is helpful to remove the heat of reaction in order to keep the reaction temperature from rising, for this will keep peracid thermal decomposition at as low a rate as practicable. A cooled flow system can be utilized to keep the temperature down. It is advisable to couple the cooled flow system with a recycle for unreacted starting material.

The peracid is added in an amount to quantitatively oxidize the lactam. It is preferred to add the peracid in a low concentration and also at a low temperature in order to prevent a runaway reaction. This process is characterized by its rapidity and a low peracid concentration is not detrimental to the reaction. The preferred concentration range is from 0.5 percent to a maximum of 10 percent of the peracid. The peracid concentration is determined according to the method taught by C. D. Wagner, R. H. Smith and E. D. Peters in Anal. Chem., 19, 976 (1947).

A solvent can be used if desired, and it must be one which is inert to the oxidizing properties of the peracid. Solvents possessing this characteristic are nitriles, esters, acids, sulfones, and tertiary alcohols. Representative examples are acetonitrile, ethyl acetate, acetic acid, pivalic acid, and t-butanol.

The process is noted by having fairly rapid reaction times. Most reactions are complete after one hour, but longer reaction times coupled with stirring, e.g., 6 hours or more, can be used with no detriment to the reaction.

The reaction can be conducted in vessels conventionally used in the oxidation art. Since it is desirable to use low reaction temperatures, it is preferred to use reaction equipment which can easily be operated under low temperature conditions and which can easily be maintained at low reaction temperatures. For these reasons, glass and stainless steel reaction vessels are desirable.

The reaction can be run in a batchwise or continuous manner. If one utilizes a continuous reaction, it can be run in either a cross-current, counter-current or co-current fashion.

The following examples are illustrative:

EXAMPLE 1

A mixture of 282.5 grams of E-caprolactam and 1.25 grams of manganic acetylacetonate were added to 250 milliliters of acetic acid and 250 milliliters of ethyl acetate in a 3000 milliliter four necked jacketed round bottom flask equipped with a dropping funnel, condenser, thermometer and stirrer. The solution was cooled to −10° C. by running brine through the jacketed reaction kettle. While the temperature was maintained at −8° to −5° C., 1520 grams of peracetic acid was added as a 25 percent solution in ethyl acetate. The reaction mixture was stirred overnight, then filtered to remove catalyst and stripped under reduced pressure. Isopropanol was added and the mixture was subsequently cooled to give 105 grams of crude adipimide present as a 33 percent yield.

EXAMPLE 2

Using the same reaction equipment as in the previous example with the exception that a 300 milliliter flask was substituted for the 3000 milliliter one, 64 grams of peracetic acid (25 percent solution in ethyl acetate) was added dropwise to 11.3 grams of E-caprolactam and 30 milligrams of manganese acetylacetonate dissolved in 50 milliliters of ethyl acetate. After stirring overnight, the catalyst was filtered from the reaction mixture which was then stripped under reduced pressure, had isopropanol added to it and then cooled. This procedure gave 2.5 grams of adipimide in a 20 percent yield with a melting point range of 94–98° C.

EXAMPLE 3

To the previously described four necked jacketed reaction flask of Example 2 were added 11.3 grams of E-caprolactam, 50 milligrams of manganic acetylacetonate, and 2 grams of Linde AW 300 molecular sieves in 1/16 inch pellet form in ethyl acetate. Peracetic acid (64 grams in a 25 percent ethyl acetate solution) was added while the reaction was in reflux. After work-up (catalyst removal, stripping, alcohol addition and cooling), 4.05 grams of adipimide was produced (36.8 percent yield). The addition of 2 more moles of peracetic acid raised the yield to 37.9 percent (4.28 grams).

EXAMPLE 4

A mixture of 282.5 grams of E-caprolactam and $10^{-5}$ moles of manganese chloride in 200 milliliters of ethyl acetate was placed in the four necked reaction flask used in previous Example 2. The reaction mixture was oxidized with 1500 grams of peracetic acid while a temperature of 0° to 10° C. was maintained. After work-up, 120 grams of crude adipimide was produced.

EXAMPLE 5

Employing the conventional equipment and similar technique of the Examples 2 to 4, 9.9 grams of valerolactam, 64 grams of peractic acid (25 percent solution in ethyl acetate) and 50 milligrams of manganic acetylacetonate were reacted in 50 milliliters of ethyl acetate. The reaction mixture was stirred overnight and then filtered to give a product with a melting point of 147–149° C. More solid resulted after solvent was removed from the filtrate under reduced pressure. Recrystallization from water gave 3.3 grams of product. An additional 2.0 grams of product resulted after removal of water from the filtrate and recrystallization of the residue from isopropanol. The total yield of product was chartreated and recrystallized from ethanol. Glutarimide was present in a 72 percent yield.

EXAMPLE 6

In 50 milliliters of ethyl acetate, there were reacted 8.5 grams of 2-pyrrolidone, 64 grams of a 25 percent peracetic acid in ethyl acetate solution and 50 milligrams of manganic acetylacetonate. After stirring overnight, work-up provided a white crystalline material with a melting point range of 115–124° C. A single recrystallization from ethanol gave 5.7 grams of succinimide (melting point 124° C.) in a 63.7 percent yield.

EXAMPLE 7

Operating with the earlier described equipment and utilizing the same techniques with a 300 milliliter flask, 9.9 grams of N-methyl-2-pyrrolidone, 50 milligrams of manganic acetylacetonate and 64 grams of 25 percent peracetic acid were reacted while dissolved in 50 milliliters of ethyl acetate. Following overnight stirring and work-up, 6.25 grams of N-methyl succinimide was produced with a melting point of 62–66° C.

EXAMPLE 8

A solution of 8.55 grams of 3-carbethoxy-2-piperidone and 50 milligrams of manganic acetylacetonate in 50 milliliters of ethyl acetate was oxidized with 32 grams of peracetic acid as a 25 percent solution in ethyl acetate. After stirring overnight and work-up after two recrystallizations from ethanol, a white product corresponding to the corresponding imide having the formula

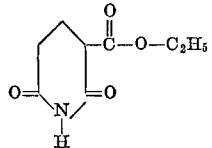

appeared in a 69 percent yield having a melting point of 74–76° C. This example is valuable for it indicates the selective oxidation of the reaction. There were three possible oxidation sites on the 3-carbethoxy-2-piperidone molecule; the hydrogen alpha to the amide nitrogen, the hydrogen alpha to the carbonyl group and the hydrogen alpha to the ester oxygen. Yet the sole reaction product was the corresponding imide indicating that oxidation took place only at the hydrogen alpha to the amide nitrogen. The example also shows that oxidation can take place on lactams possessing various functional groups, be they inert or potentially subject to oxidation themselves.

EXAMPLE 9

The lactam used in this example, N-formyl piperidine was the reaction product of 20 grams of piperidine and 40 grams of ethyl formate which had been heated to reflux and then distilled. The product was collected at 80–82° C. and 4 mm. Hg pressure.

N-formyl piperidine, produced via the reaction described above, in an amount of 11.3 grams was added to $5.1 \times 10^{-3}$ moles of manganese chloride in 50 milliliters of ethyl acetate in the standard reaction vessel for these experiments. Oxidation with 120 grams of peracetic acid took place at low temperature (0° C.±10) and was reacted overnight. On work-up N-formyl piperidone which had been contaminated with starting material was collected at 80–82° C. and 3 mm. Hg pressure. Gas-liquid chromatographic separation yielded pure product.

What is claimed is:

1. A process for the production of a cyclic imide of the formula

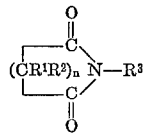

wherein $R^1$ and $R^2$ can be alike or different and are selected from the group consisting of hydrogen, alkyl, aryl and alkaryl; $R^3$ is selected from the group consisting of hydrogen and alkyl; and alkaryl; and $n$ is an integer from 2 to 13; which comprises admixing in the liquid phase a lactam of the formula

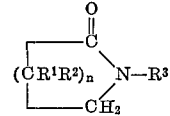

wherein $R^1$, $R^2$, $R^3$ and $n$ are defined as above with a solution of a peracid, said admixture having a peracid concentration of no greater than 10 percent, at a temperature of about −50° C. to about 150° C. in the presence of a metal ion catalyst, said metal being selected from the group consisting of manganese, cobalt, nickel, vanadium and iron.

2. The process according to claim 1 wherein said peracid is peracetic acid.

3. The process according to claim 1 wherein said metal ion catalyst is manganese (II) or manganese (III).

4. The process according to claim 1 wherein said metal ion catalyst is manganese chloride.

5. The process according to claim 1 wherein said lactam is E-caprolactam.

6. The process according to claim 1 wherein said lactam is valerolactam.

7. The process according to claim 1 wherein said lactam is 2-pyrrolidone.

8. The process according to claim 1 wherein said lactam is N-methyl-2-pyrrolidone.

9. The process according to claim 1 wherein said lactam is 3-carboethoxy-2-piperidone.

10. The process according to claim 1 wherein said process is carried out at a temperature of from about −10° to about 25° C.

No references cited.

HENRY R. JILES, Primary Examiner

R. T. BOND, Assistant Examiner

U.S. Cl. X.R.

260—294.7 F, 281, 326.5 FM, 326 R, 41 C; 252—431 C, 471, 472, 461

PO-1050
(5/69)

UNITED STATES PATENT OFFICE
CERTIFICATE OF CORRECTION

Patent No. 3,634,406    Dated January 11, 1972

Inventor(s)    A. R. Doumaux

It is certified that error appears in the above-identified patent and that said Letters Patent are hereby corrected as shown below:

Claim 1, column 6, line 4, delete "and alkaryl;".

Signed and sealed this 30th day of May 1972.

(SEAL)
Attest:

EDWARD M. FLETCHER, JR.
Attesting Officer

ROBERT GOTTSCHALK
Commissioner of Patents